Oct. 11, 1955   M. H. GRAHAM   2,720,155
COFFEE MAKER
Filed Aug. 2, 1951   2 Sheets-Sheet 1
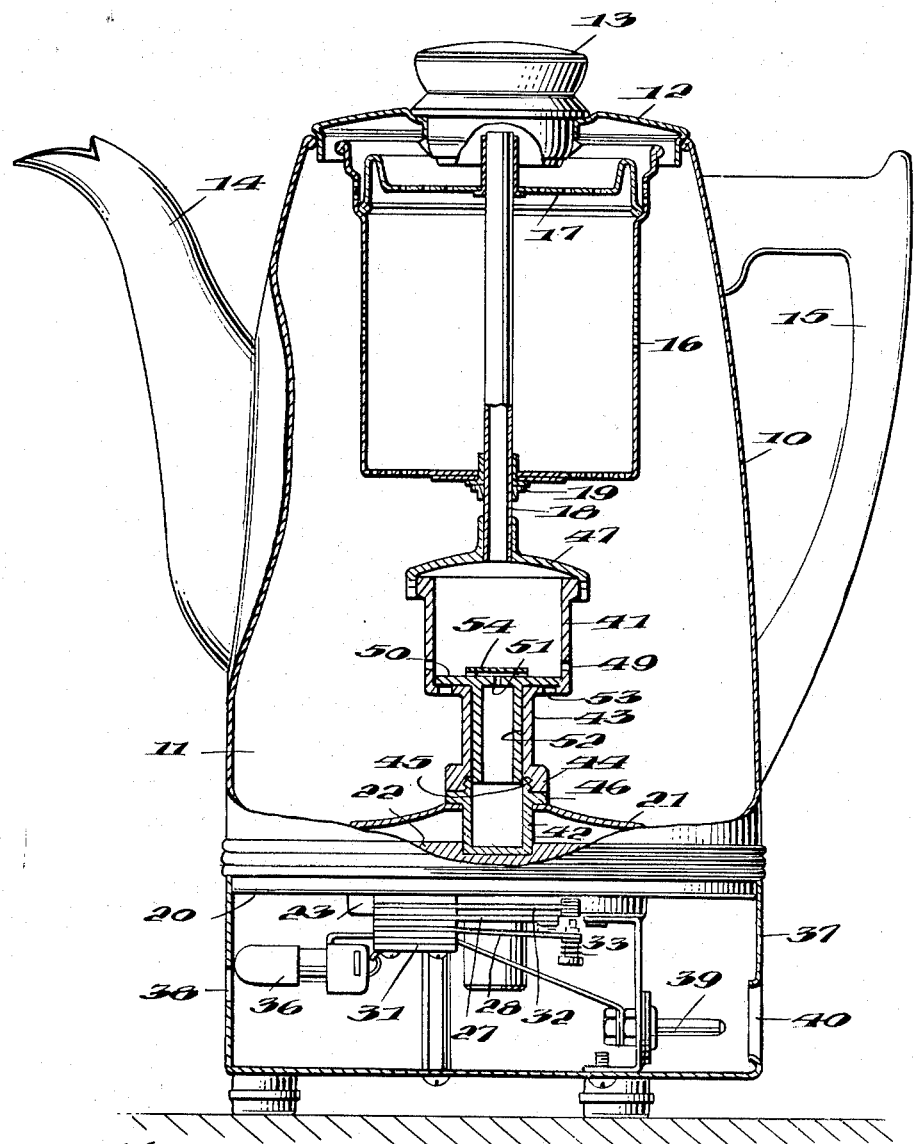
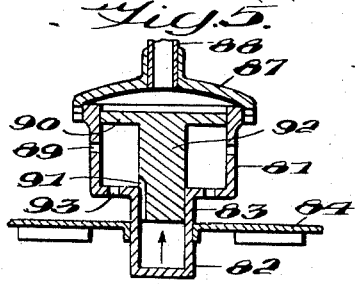
INVENTOR
MAURICE H. GRAHAM,
BY Parry Miller & Purvill
ATTORNEYS Oct. 11, 1955  M. H. GRAHAM  2,720,155
COFFEE MAKER Filed Aug. 2, 1951  2 Sheets-Sheet 2

INVENTOR
MAURICE H. GRAHAM,

BY *Perry Miller & Peverill*
ATTORNEYS

United States Patent Office 2,720,155
Patented Oct. 11, 1955

2,720,155

COFFEE MAKER

Maurice H. Graham, Hopkins, Minn.; Maurice W. Graham and Northwestern National Bank of Minneapolis, Hennepin County, Minn., executors of said Maurice H. Graham, deceased Application August 2, 1951, Serial No. 239,981

6 Claims. (Cl. 99—310)

This invention relates to coffee makers of the type wherein the liquid to be infused is repeatedly circulated through a bed of coffee grounds and it is particularly directed to such general type of coffee maker having an improved novel reciprocating pump mechanism for effecting circulation.

One object of the invention is to circulate liquid to be infused through a bed of coffee by intermittent pumping action under the force of steam.

Another object of the invention is to circulate liquid to be infused at below boiling temperature by a reciprocating pump operated by steam converted from liquid at above boiling temperature.

Another object of the invention is to circulate liquid to be infused by a reciprocating pump operated by steam converted from minor quantities of such liquid.

Another object of the invention is to provide a closed steam generation chamber in conjunction with a steam operated reciprocating pump and to supply liquid to such chamber from a body to be infused through a small orifice.

Another object of the invention is to circulate liquid to be infused by a steam driven pump immersed in the liquid and the pumping action of which is determined by the temperature of the liquid.

Another object of the invention is to effect circulation of liquid to be infused by a steam operated reciprocating pump supplied by a steam generator and to automatically terminate generation of steam and operation of the pump by a timing mechanism when the liquid has been brewed to proper strength.

The invention will be understood readily by reference to the accompanying drawings and the detailed description to follow. In such drawings:

Fig. 1 is a side view, partly in elevation and partly in section illustrating a coffee maker embodying my invention;

Fig. 5 is a fragmentary enlarged vertical section of another modified form of circulating mechanism;

Fig. 6 is a view in cross section of the lower portion of the mechanism shown in Fig. 5;

Figure 2:
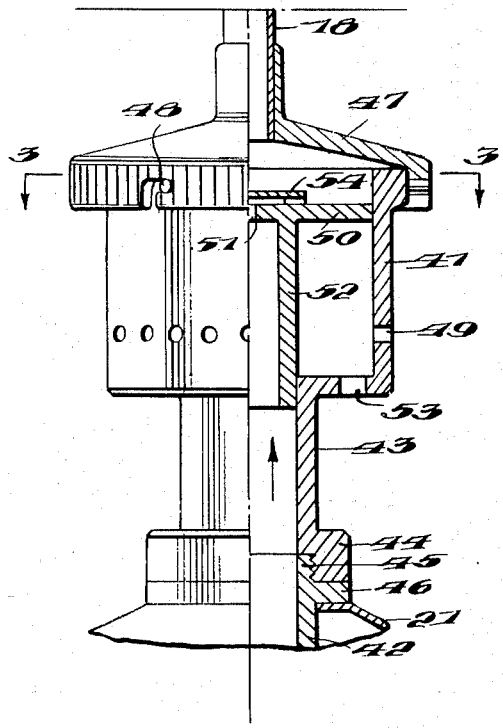
Fig. 2 is a fragmentary enlarged view partly in section and partly in elevation of the circulating mechanism shown in Fig. 1.
Figure 3:
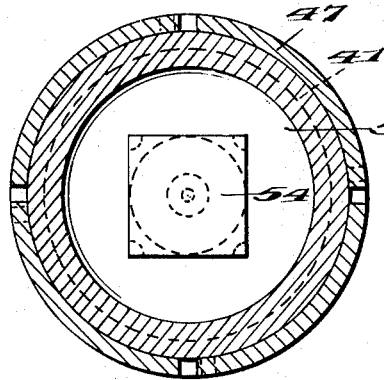
Fig. 3 is a view in cross section taken at line 3—3 of Fig. 2.

Referring first to the embodiment of Figs. 1 to 3 there is shown a coffee making vessel 10 which may be made in conventional form and composed of stainless steel or other metal or glass. Interiorly of the vessel is a chamber 11 for holding the liquid to be infused. A removable top 12 closes the upper end of the vessel. Secured centrally of the top is a hollow liquid spreading cap 13, preferably made of glass. A pouring spout 14 and handle 15 are provided on opposite sides of the vessel.

A perforate coffee holder 16 having a removable perforate top 17 is located in the upper portion of vessel 10 above the top level of the liquid in chamber 11. Extending upwardly through the coffee holder and upwardly in to cap 13 is a fountain tube 18 for circulating liquid from chamber 10 through coffee in the coffee holder, from which it recirculates back to chamber 10. A flanged sleeve 19 secured to tube 18 provides a seat upon which the coffee holder is removably supported.

Figure 7:
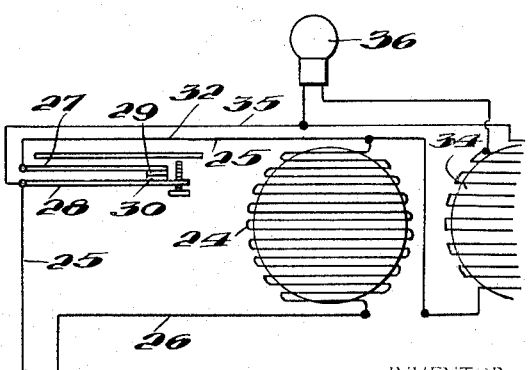
Fig. 7 is a diagrammatic view of the heating and control electric circuit.

The bottom of the vessel includes an annular portion 20 which surrounds a raised central bottom portion 21 which forms a hollow housing. Located in such housing is a metal heating plate 22, preferably of brass. A similar lower plate 23 is bolted to the upper plate, the same being shown projecting below the plane of annular bottom portion 20 in Fig. 1. Sandwiched between plates 22 and 23 and insulated therefrom by mica (not shown) is a flat heating element 24. As shown in Fig. 7 the same comprises a coil of electrical resistance wire wound on a flat disc of mica or other suitable insulating material. The heating element connects with electric lines 25 and 26. An automatic timing device is provided to terminate circulation of liquid at the end of a predetermined brewing period. This is of a thermostatic switch type. As shown in Figs. 1 and 7 the same comprises a pair of spring metal switch arms 27 and 28 having normally closed contacts 29 and 30 and supported by an insulating mounting 31 in the form of a series of washers. Such mounting is secured to the underside of annular vessel bottom portion 20. Secured by mounting 31 in spaced proximate relation to the bottom portion is a bimetal thermostatic arm 32 responsive to the heat of the liquid in chamber 10. An adjustable actuating screw 33 is threaded to an extension of switch arm 28. The bimetal arm is arranged to warp downwardly in response to heating and at a temperature determined by the setting of screw 33 will depress switch arm 28 and open switch contacts 29 and 30.

An electrical resistance element 34 is connected to electric line 25 and through line 35 to switch arm 27. The same is conveniently of the same wound disc form as heating element 24 and the same can be sandwiched between plates 22 and 23 with mica insulating it from the underside of the heating element. When switch contacts 29 and 30 are closed during the brewing period resistance 34 is shunted out of the circuit and full current is supplied to heating element 24. When the contacts are opened at the end of the brewing period by bimetal arm 32 resistance 34 is thrown in series with the heating element so that a lower amount of heat is supplied to keep the brew at a suitable drinking temperature sufficiently high to cause the bimetal arm to maintain the switch contacts open. The stand-by heating temperature will be sufficiently high to prevent resumed circulation of the brew through the coffee bed by the circulating mechanism hereafter to be described. If the arrangement were such that heating was discontinued at the end of the brewing period the bottom of the vessel and the brew would cool sufficiently to cause the bimetal arm to close the switch contacts, resulting in the supply of full current to the heating element. By way of example, the heating element 24, may be of 400 wattage and resistance 34 of an ohmage to reduce it to 65 wattage.

An electric signal light 36 is provided to indicate the end of the brewing period. The same can be supported by any suitable bracket beneath bottom portion 20 of the vessel. Such light and the thermostatic timing switch are mounted interiorly of a hollow vessel base 37. A viewing port 38 is provided in the side wall of the base. The signal light may comprise a low voltage lamp. The same may be connected in the circuit to be lighted during the brewing period and to cut off to signal the end of such period. Alternately, and as shown in Fig. 7, the light is connected so as to be inoperative during the brewing period and to flash on to signal the end of the brewing period. The same is shown in shunt with a few of the coils of electric resistance element 34 so as to be energized when the bimetal arm opens the switch contacts to throw the resistance element into circuit with heating element 24.

Also mounted in hollow base 37 are a pair of electric terminal pins 39, one of which is seen in Fig. 1. Such pins are supported by any suitable form of bracket. An opening 40 in the side of the base permits a conventional plug from an electric cord to be connected to the pins.

The circulating mechanism for circulating liquid from the liquid chamber 11 to the coffee holder 16 comprises a reciprocating piston pump as previously stated. The same comprises a pump cylinder 41 located in chamber 11 adapted to be immersed in the liquid to be circulated. Below the cylinder is a steam generating well portion 42 seating in a recess, in heating plate 42 in the central raised bottom of portion 21 of the vessel. A tubular lower cylinder integral with the bottom of the cylinder and of substantially the same diameter as well 42 has an enlarged threaded lower end 44 removably connected to threaded upper end 45 of the well portion. A flange 46 makes a fluid-tight connection of the well portion with end portion 44 and vessel bottom portion 21, the latter connection preferably being made by soldering.

Cylinder 41 is provided with a removable top 47 which is secured in place in any designed manner, as by bayonet joints 48. The lower end of fountain tube 18 extends into a sleeve formed integrally with the top and such tube and coffee basket 16 are supported in position by the described pump structure.

Inlet ports 49 are provided in the lower side wall area of cylinder 41 for admitting liquid from chamber 11 into the cylinder. A reciprocating piston 50 works in the cylinder to pump liquid entering cylinder through ports 49 under gravity up the fountain tube from which it discharges into cap 13 and discharges downwardly into coffee holder 16. As the piston moves upwardly from its rest position it passes ports 49 so that all liquid in the cylinder is forced upwardly into the fountain tube. Upon return of the piston from its pumping stroke ports 49 again communicate with the cylinder above the piston so that the cylinder can again fill with liquid from chamber 11.

Piston 50 is driven by steam generated intermittently from liquid in highly heated well portion 42. Small quantities of liquid from chamber 11 are intermittently supplied to the well portion through a pinhole orifice 51 in piston 50. Such orifice 51 may, for example, be of 0.031" size. I have found that anywhere in the range of 0.031" to 0.035" is satisfactory and the size may vary beyond such limits, some cases depending upon the diameter of the cylinder and piston. It is important, however, that orifice 51 be of small size so as to admit only such a small quantity of liquid into well portion as can be quickly vaporized into steam. The small size is further important so that the steam can build up pressure against the under side of the piston and drive it upwardly in the cylinder. A tubular sleeve extends downwardly from piston 50 around orifice 51 and slides in cylinder portion 43. Only three or four drops, or perhaps a teaspoon, of liquid will supply adequate steam pressure to cause the piston to drive the liquid in cylinder 41 up the fountain tube. If desired, additional inlet ports 53 may be provided in the bottom of cylinder 41 which permit liquid from chamber 11 to enter the cylinder below the piston as it moves upwardly. Such liquid cushions the piston on its return stroke as it gradually flows out again through ports 53.

Because of its pressure the steam escapes into cylinder 41 and the reduced extension 43 cools the interior of the cylinder below the piston sufficiently after the escape of steam through orifice 51 that by the time the piston returns to its rest position in the bottom of the cylinder a slight vacuum exists below the piston. Such vacuum causes a further small quanity of liquid to be sucked in through orifice 51 where it is generated into steam to again drive the piston on its working stroke. If desired, a baffle 54 may be soldered to the upper side of piston 50 with a space in between. This serves to prevent strong bursts of steam discharges through orifice 51 from entering the fountain tube.

The operation will now be more fully described. The heating circuit is energized to cause heating element 24 to heat heating plate 22. Chamber 11 of the vessel is then filled with liquid sufficient to immerse the entire pump mechanism. Within a few minutes sufficient heat is developed in well portion 42 to start the generation of steam but without sufficient pressure to operate the piston properly. Until the liquid in chamber 10 is heated up to about 160° F. it exercises a cooling effect sufficient to prevent proper steam generation. However, during the preliminary heat-up period the piston may reciprocate slightly in the cylinder. At about 160° F. liquid pumping action begins with the piston on each working stroke driving liquid up the fountain tube for infusion in the coffee holder. The pumping strokes come about every ten seconds at first but intervals between progressively decrease as heating continues. By the time liquid in chamber 11 reaches a temperature in the range of 180° F. to 190° F. the pumping strokes of the piston occur at about one second intervals. By this time liquid has been circulated through the coffee by the pump to proper brew strength. Generation of steam and pumping action is terminated at this time by opening of switch contacts 29 and 30 by bimetal arm 32. The strength of the brew and the cut off time can be varied through the adjustable actuating screw 33. If high heating were continued the pump would become inooperative because the temperature of the liquid in chamber 11 would be too high for the liquid to provide a sufficient cooling effect to create the vacuum necessary for liquid to be sucked into the steam generator through orifice 51.

The various described parts of the pump and steam generator mechanism will preferably be made of brass but they can be made of other metal or of glass. The size of the pump can be varied according to the liquid capacity of the coffee maker. Adequate steam pressure can be developed to drive the piston of any required size. By way of example, the diameter of piston 50 and the inside diameter of cylinder 41 may be about 1¼" and the corresponding diameters of lower portions 43 and 52 may be half that. Depth of the cylinder can be such as to give the piston a working stroke of about ½". Because of the small quantity of liquid generation into steam strokes of the piston should not be too long. The fountain tube may be of any conventional size, say, ¼".

Various types of single and multiple heating units and control circuits may be employed for the rapid generation of steam in well portion 42 and for gradually heating the liquid in the chamber 11. The liquid in the latter chamber should be heated sufficiently slowly from about 160° F. to about 180° or 185° F., the operating period of the pump, that the pump has sufficient time to circulate the liquid through the coffee to proper strength.

Figure 4:
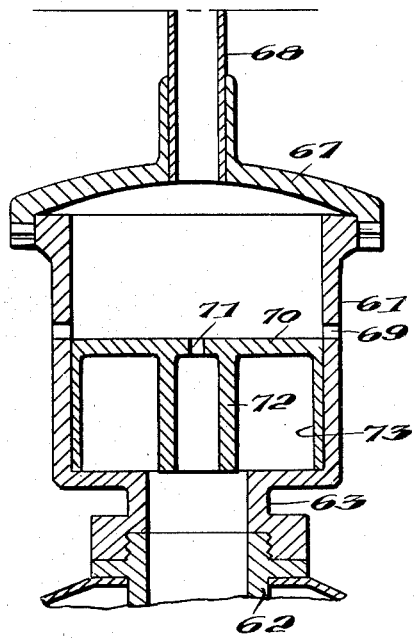
Fig. 4 is a fragmentary enlarged vertical section of a modified form of circulating mechanism.

Fig. 4 shows a modified form of circulating pump. The parts of the coffee maker not shown and the heating and control circuit may be the same as shown in Figs. 1 and 7. Pump cylinder 61 is generally similar to the one previously described except that it is somewhat deeper to accommodate all reciprocating parts therein. The cylinder is supplied with steam by a well portion 62 similar to that previously described and it is removably connected thereto through a relatively short integral lower cylinder portion 63 which is removably threaded on the upper end of the well as previously described. Top 67 is removably secured to cylinder 61 and connects with fountain tube 68. As before the fountain tube supports a coffee holder (not shown). Inlet ports 69 are provided in the side of cylinder 61 about one-half way up. Piston 70 works in the cylinder and in its rest position is below the inlet ports so that liquid from the surrounding body to be infused fills the upper portion of the cylinder. A pinhole orifice 71 is provided at the center of the piston for delivering small quantities of water to well portion 62 for generation into steam after driving the piston upwardly on its working stroke the steam escapes through the same orifice. Surrounding the orifice and formed integrally with the underside of piston 70 is a tubular portion. While not entirely necessary it is found that such tubular portion concentrates the force of the steam on the central area of the piston and facilitates its escape. Also integral with the piston is a skirt 73 fitting the cylinder. Portion 72 need not extend down into lower cylinder to portion 63 and can be made the same length as the skirt. The piston can be made from thin light brass or other metal and desirably of light weight.

The intermittent supply of small quantities of liquid to the well, the generation of steam and the liquid pumping action of the piston will be the same as in the first embodiment and no further description is required.

The further form of circulating pump for the liquid to be infused shown in Figs. 5 and 6 somewhat resembles that shown in Figs. 1 and 2. The same includes a pump cylinder 81, a steam generating well portion 82 connecting with the cylinder through a lower cylinder portion 83 of the same diameter as the well which is shown formed integrally therein. As before the well is located below a raised central bottom portion 84 of the coffee maker. The well will be subject to intense heating by heating plate (not shown) as in the first embodiment. The cylinder has a removable top 87 which connects with a fountain tube 88 through which the liquid will be circulated to a coffee holder.

Inlet ports 89 in the side of the cylinder permit liquid from the surrounding body to be circulated to fill the cylinder. A piston 90 shown at the upper end of its pumping stroke drives the liquid from the cylinder up through the fountain tube. A second piston 92 integral with piston 90 but of smaller diameter slides in lower cylinder portion 83 and is acted upon by the steam pressure generated in the well to drive both pistons on their working stroke. Piston 92 is solid. A longitudinal groove in the lower portion of piston 92 constitutes an orifice of approximately the dimensions previously given for admitting small quantities of water into well 82 for rapid generation into steam for driving the pistons. Such groove is uncovered when the pistons move upwardly and is closed when the piston moves downwardly.

When the pistons are up at the end of their working stroke the steam under pressure escapes out through groove 91 and condenses in cylinder 81. Additional ports 93 may be provided in the bottom of cylinder 81 to facilitate downward movement of the pistons, such ports permitting liquid which enters below piston 90 on the upward stroke to escape from the cylinder on the downward stroke. The intake of liquid through groove 91 is under suction developed by the cooling effect of the surround liquid on the lower cylinder portion 83. Operation is otherwise as in the description of the first embodiment.

I claim:

1. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube for conducting liquid from said chamber to the coffee holder, a steam-driven reciprocating pump operative to pump liquid from said liquid chamber through the tube to the coffee holder including a pump cylinder located in the liquid chamber and having a liquid inlet port communicating with said chamber and a liquid outlet communicating with the tube, and a liquid pumping piston in the cylinder, and a steam generating well projecting exteriorly of the liquid chamber and communicating with the pump cylinder on one side of the piston and a pin hole orifice in the piston communicating with the steam generating well intermittently delivering liquid from the cylinder into the steam generating chamber for conversion into steam for operating the piston.

2. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube for conducting liquid from said chamber to the coffee holder, a steam-driven reciprocating pump operative to pump liquid from said liquid chamber through the tube to the coffee holder including a pump cylinder located in the liquid chamber, a liquid pumping piston in the cylinder, a liquid inlet port in the cylinder communicating with the liquid chamber located so as to be closed by the piston during its pumping stroke, a steam generating chamber communicating with the cylinder on one side of the piston and a pinhole orifice in the piston communicating with the steam generating chamber intermittently delivering liquid from the cylinder into the steam generating chamber for conversion into steam for operating the piston.

3. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube for conducting liquid from said chamber to the coffee holder, a steam-driven reciprocating pump operative to pump liquid from said liquid chamber through the tube to the coffee holder including a pump cylinder projecting upwardly in the liquid chamber and having a liquid inlet port communicating with said chamber and a liquid outlet communicating with the tube, a liquid pumping piston in the cylinder, a steam generating chamber projecting below the bottom of the vessel and intermittently supplying steam for operating the piston, the lower end of the cylinder being removably connected in fluid-tight relation with the upper end of the steam generating chamber, and a pinhole orifice in the piston communicating with the steam generating chamber intermittently delivering liquid from the cylinder to the steam generating chamber.

4. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube for conducting liquid from said chamber to the coffee holder, liquid circulating means communicating with the tube for pumping liquid therethrough, said means comprising a pump cylinder communicating with the liquid chamber for the inflow of liquid thereto, and a reciprocating piston in the cylinder for pumping the liquid to the tube, a steam generating chamber for converting liquid in small quantity into steam and communicating with the cylinder to intermittently supply steam thereto for reciprocating said piston, and a pin-hole orifice in said piston communicating with the steam generating chamber to intermittently admit liquid in small quantity thereto for conversion to steam.

5. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube for conducting liquid from said chamber to the coffee holder, liquid circulating means communicating with the tube for pumping liquid therethrough, said means comprising a pump cylinder communicating with the liquid chamber for the inflow of liquid thereto, and a reciprocating piston in the cylinder for pumping the liquid to the tube, a steam generating chamber for converting liquid in small quantity into steam and communicating with the cylinder to intermittently supply steam thereto for reciprocating said piston, one wall of the steam generating chamber comprising a portion of said piston closing said steam generating chamber for the build up of steam pressure therein, and a pin-hole orifice in said piston portion communicating with the steam generating chamber to admit liquid in small quantity thereto for conversion to steam.

6. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube for conducting liquid from said chamber to the coffee holder, liquid circulating means communicating with the tube for pumping liquid therethrough, said means comprising a closed cylinder having ports open to the liquid chamber for the inflow of liquid thereto, and a reciprocating piston in the cylinder for pumping the liquid to the tube, a steam generating chamber for converting liquid in small quantity into steam and communicating with the cylinder to intermittently supply steam thereto for reciprocating said piston, one wall of said steam generating chamber comprising a portion of said piston closing said steam generating chamber for the build up of steam pressure therein, and a pin-hole orifice in said piston portion communicating with the steam generating chamber to admit liquid in small quantity thereto for conversion to steam.

References Cited in the file of this patent

UNITED STATES PATENTS

| | | |
|---|---|---|
| 53,269 | Butler | Mar. 20, 1866 |
| 868,187 | Ives | Oct. 15, 1907 |
| 997,845 | O'Mara | July 11, 1911 |
| 1,047,402 | Gefter | Dec. 17, 1912 |
| 1,167,775 | Miller | Jan. 11, 1916 |
| 1,680,571 | Routsos | Aug. 14, 1928 |
| 1,696,451 | Rankin | Dec. 25, 1928 |
| 1,774,598 | Hubbard | Sept. 2, 1930 |
| 1,972,164 | Peirce | Sept. 4, 1934 |
| 2,025,302 | Olds | Dec. 24, 1935 |
| 2,175,727 | Graham | Oct. 10, 1939 |
| 2,552,169 | Graham | May 8, 1951 |